United States Patent
Bastiaans

(10) Patent No.: US 9,757,766 B2
(45) Date of Patent: Sep. 12, 2017

(54) DEVICE AND A METHOD FOR APPLYING A HARDENABLE PLASTICS COATING IN A TUBULAR CONSTRUCTION

(71) Applicant: RENO-PIPE B.V., Arcen (NL)

(72) Inventor: Mathieu Christiaan Joseph Bastiaans, Arcen (NL)

(73) Assignee: SPRAY-LINER GMBH, Bergisch Gladbach (DE)

( * ) Notice: Subject to any disclaimer, the term of this patent is extended or adjusted under 35 U.S.C. 154(b) by 262 days.

(21) Appl. No.: 14/367,967

(22) PCT Filed: Dec. 21, 2012

(86) PCT No.: PCT/NL2012/050917
§ 371 (c)(1),
(2) Date: Jun. 23, 2014

(87) PCT Pub. No.: WO2013/095143
PCT Pub. Date: Jun. 27, 2013

(65) Prior Publication Data
US 2014/0349010 A1 Nov. 27, 2014

(30) Foreign Application Priority Data
Dec. 23, 2011 (NL) ...................................... 2008027

(51) Int. Cl.
*B05B 13/06* (2006.01)
*B05D 7/22* (2006.01)
(Continued)

(52) U.S. Cl.
CPC .................. *B05D 1/02* (2013.01); *B05B 3/00* (2013.01); *B05B 13/0636* (2013.01);
(Continued)

(58) Field of Classification Search
USPC ............... 118/306, 317, 318, 323, 321, 712; 427/236, 239, 424, 427.4, 427.3;
(Continued)

(56) References Cited

U.S. PATENT DOCUMENTS 5,951,761 A * 9/1999 Edstrom ............. B05B 13/0636
118/306
6,263,534 B1 * 7/2001 McCann ............. F16L 55/1645
118/408

(Continued)

FOREIGN PATENT DOCUMENTS

CH        275 352 A        5/1951
DE    198 23 398 A1    12/1999
(Continued)

OTHER PUBLICATIONS

International Search Report, dated Mar. 28, 2013, from corresponding PCT application.

*Primary Examiner* — Yewebdar Tadesse
(74) *Attorney, Agent, or Firm* — Young & Thompson

(57) ABSTRACT

A device (1) for applying a coating of hardenable plastic to an inner side of a wall of a tubular construction, for example a sewage pipe, includes a supply chamber (3) for containing a hardenable plastic, a delivery head (2) including an outlet (5) for letting out the hardenable plastic from the delivery head (2), and a pump (11) for transporting the hardenable plastic from the supply chamber (3) to the outlet (5). During use, the outlet (5) is positioned at various angular positions with respect to a rotation axis (40), so that the entire circumference of the inner side of the wall of the tubular construction can be provided with the hardenable plastics coating. The supply chamber (3) includes a flexible wall for optimal maneuverability of the device (1), whereby broad application of the device (1) is possible.

26 Claims, 4 Drawing Sheets

(51) Int. Cl.
  *B05B 3/00* (2006.01)
  *B05D 1/02* (2006.01)
  *F16L 55/1645* (2006.01)
  *F16L 55/179* (2006.01)
  *F16L 55/40* (2006.01)
  *F16L 58/10* (2006.01)

(52) U.S. Cl.
  CPC ......... *F16L 55/1645* (2013.01); *F16L 55/179* (2013.01); *F16L 55/40* (2013.01); *F16L 58/1009* (2013.01)

(58) Field of Classification Search
  USPC ................................ 239/703, 224, 223, 700
  See application file for complete search history.

(56) References Cited

U.S. PATENT DOCUMENTS

| 6,969,427 B1 * | 11/2005 | Noles, Jr. ................. B05C 7/08 |
| | | 118/317 |
| 7,992,514 B1 | 8/2011 | Weisenberg et al. |

FOREIGN PATENT DOCUMENTS

| EP | 2 230 021 A1 | 9/2010 |
| WO | 02/43877 A1 | 6/2002 |
| WO | WO 02/43877 A1 * | 6/2002 |
| WO | 03/014613 A1 | 2/2003 |

* cited by examiner

DEVICE AND A METHOD FOR APPLYING A HARDENABLE PLASTICS COATING IN A TUBULAR CONSTRUCTION

BACKGROUND OF THE INVENTION

Field of the Invention

The invention relates to a device for applying a hardenable plastics coating to an inner side of a wall of a tubular construction, for example a sewage pipe, wherein the inner side of the wall of the tubular construction, after hardening of the plastics coating, is fluid-tight.

The invention also relates to a supply chamber for containing a hardenable plastic, for use in the device according to the present invention.

The invention also relates to a method for applying the coating of hardenable plastic by means of the device according to the present invention.

The invention furthermore relates to a set of a device for applying a hardenable plastics coating to an inner side of a wall of a tubular construction, for example a sewage pipe, and a device for cleaning elements of the coating applying device, particularly elements which are exposed to hardenable plastic during operation of the coating applying device.

Description of the Related Art

The fluid-tight sealing of tubular constructions generally takes place within the framework of renovation of existing pipes which are no longer fluid-tight, for example as a result of corrosion, the penetration of tree roots, calcification of the pipe, subsidence of the ground and/or fractures resulting from the movement of the construction in which they are housed. Although the present invention is particularly described for pipe parts of circular cross-section, such as sewage pipes, it will be clear to the person skilled in the art that this is purely illustrative and that the shape of the cross-section of the tubular construction to be renovated is not limiting for the device and the method according to the present invention.

A first known technique for the renovation of sewage pipes which is used is the complete replacement of a bad section of a pipe. This technique is quite drastic, since that section of the pipe which is to be replaced must be made accessible by the exposure thereof before it can be replaced. Should that section of the pipe which is to be replaced be situated outdoors under the ground, then the exposure of this section according to the above technique usually involves the necessary earthwork. Should that section of the pipe which is to be replaced be situated indoors, then it is often necessary to at least partially remove floor tiles or wall tiles before the piece of pipe to be renovated can be replaced. In both above-mentioned situations, the renovation takes a relatively long time and involves, in addition to the nuisance that goes with it, fairly high costs.

A second known technique is aimed at not physically replacing that section of a pipe which is to be renovated. This technique, which is known as "relining" or "sleeve renovation", makes use of a so-called "liner" or inner tube, which is fitted into the pipe to be renovated and is connected to an inner wall of the pipe, for example by gluing. The "liner" or inner tube usually comprises a needle felt sleeve, possibly reinforced with glass fibre, which is impregnated with a hardenable plastic, for example epoxy resin. In the case of a needle felt sleeve, this is unrolled, by the use of air pressure, inside out into the pipe to be renovated. After this, the hardenable plastic is hardened, for example by passing UV light, warm water or steam through the "liner". As a result, the "liner" is connected to the inner wall of that section of the pipe which is to be renovated and a seamless and self-supporting pipe is obtained in the old pipe. A drawback of this way of doing is that the diameter of the renovated pipe is smaller than the diameter of the original pipe. This need not present a problem in practice, however, since the original pipes are usually over-dimensioned, whereby a reduction in diameter as a result of "relining" need not be problematical.

Since, if the second known technique is used, the piece of pipe to be replaced does not need to be exposed, nuisance both outdoors and indoors can be significantly reduced. Because earthwork and/or cutting work can be avoided or can at least be confined to a minimum, the fitting of the "liner" or inner tube can be done relatively quickly and the costs of the renovation can remain relatively limited.

A drawback of the second known technique, especially if used indoors, is that side connections, that is to say pipes which extend between sanitary fittings, such as taps, wash basins, wall-mounted toilets, bath tubs, shower trays, etc., and sewage pipes having an internal diameter within the range of 50-100 mm, following renovation of the latter, so-called "main pipes", cannot be tapped or jointly renovated. At present, it is therefore not possible to cost-effectively provide the above-described side connections with a "liner" according to the second known technique. Hence, it is currently necessary to replace side connections which must at least partially be renovated according to the above-described first known technique. This causes nuisance and contributes to higher costs. It is especially disadvantageous if there is a need to resort to cutting work to expose the pipe part to be renovated where luxury finishing of, for example, walls and/or floors is concerned, and/or should a certain type of finishing no longer be obtainable.

WO 2003/014613 discloses a polyurethane applicator for spraying at high-pressures a liner on the inner circumferential wall of an existing conduit to be rehabilitated. The applicator includes a carriage coaxially guided in the conduit and an atomizer rotatably mounted to the carriage for rotation about the central axis thereof. The atomizer is provided with a nozzle through which the lining mixture is forced out while the atomizer rotates and travels in conduit with the carriage.

EP 2 230 021 discloses a device for applying an internal coating in tubes which comprises a nozzle and a mixing casing arranged in connection with the nozzle and configured to receive at least two coating material components. Driving means intended to be located outside the tube to be coated and configured to drive an elongated flexible element to rotate also causes said nozzle to rotate by being connected to said flexible element while throwing said coating material substantially radially outwards towards inner walls of the tube. Mixing members inside a mixing compartment of the mixing casing are brought to carry out a stirring movement inside said compartment for mixing the coating material components arriving thereto to a substantially homogenous mixture, which is drained to said nozzle.

SUMMARY OF THE INVENTION

It is an object of the present invention to provide a device for applying a fluid-tight coating in tubular constructions in general and the above-mentioned side connections in particular, hence, a device which is suitable to be used in virtually all practical situations, including situations involving tubular constructions having a relatively small diameter.

It is also an object of the present invention to provide a method for making tubular constructions in general, and the above-mentioned side connections in particular, fluid-tight by means of a device according to the present invention.

According to the present invention, a device is provided which comprises a supply chamber for containing a hardenable plastic, a delivery head comprising an outlet for letting out the hardenable plastic from the delivery head, and a pump for transporting the hardenable plastic from the supply chamber to the delivery head, wherein the outlet is movable to various angular positions with respect to a rotation axis, for allowing the hardenable plastic to be let out of the delivery head at various angular positions with respect to the rotation axis, and wherein the supply chamber comprises a flexible wall.

When the device according to the present invention is operated, the outlet can be made to perform a rotation movement about a rotation axis, so that the outlet is repeatedly moved to all possible angular positions with respect to the rotation axis. In that way, it is possible for an outgoing flow of hardenable plastic to cover the entire circumference of an inner side of a wall of a tubular construction. The rotation axis may be a centre axis of the delivery head. The delivery head may comprise a rotatably arranged element which is provided with openings, wherein the openings constitute the outlet. When hardenable plastic is supplied to the delivery head and the element is rotated, it is achieved that the openings perform a rotation movement so that the entire circumference of a tubular construction to be renovated is covered with the hardenable plastic. As a result of the pressure of the pump, the hardenable plastic squirts out through the outlet of the delivery head. In particular, the hardenable plastic is flung in such a way against the inner side of the wall of the tubular construction to be renovated that a plastics coating is obtained, which plastics coating, once hardened, makes the tubular construction fluid-tight.

It is also possible that, during use of the device, the hardenable plastic is flung against the inner side of the wall of the tubular construction solely under the influence of centrifugal force, as a result of rotation of the delivery head. In view of the above, the delivery head of the device can be construed as an extrusion-centrifugal head or as a centrifugal head. It will be clear to a person skilled in the art that should the outlet and/or the delivery head not be rotated, then it is a matter of an extrusion head if the hardenable plastic is brought out of the delivery head as a result of the pressure of the pump.

In the case of use as an extrusion-centrifugal head, at least the outlet of the delivery head is rotatable about a centre axis of the delivery head, wherein the centre axis of the delivery head extends substantially parallel to that section of the tubular construction which is to be renovated. It will be clear to the person skilled in the art that, if used as a centrifugal head, the delivery head is preferably rotatable in its entirety about its centre axis.

In view of the fact that the supply chamber, i.e. the chamber for supplying the hardenable plastic towards the outlet of the delivery head, comprises a flexible wall, the delivery head can be positioned through bends and in side connections having a diameter in a range of which a minimum value can be as small as 28 mm, also in cases in which a section of the supply chamber is located outside the delivery head, which is not possible in the case of devices according to the prior art.

An advantage of the flinging of the hardenable plastic against the inner side of the wall of the tubular construction, which plastic squirts out of the outlet of the delivery head, possibly as a result of pressure by the pump, is that hardly any spray or no spray arises when the hardenable plastic leaves the outlet of the delivery head. Hence, the hardenable plastics coating can be applied virtually without mist and, for example, a camera can be used to position the delivery head of the device in the tubular construction, for example, or to monitor the process of applying the plastics coating.

The hardenable plastic can be hardened by, for example, passing warm water and/or steam along it. It is also possible to use a hardenable plastic which hardens as a result of, for example, a chemical reaction which arises between the hardenable plastic and a material contained in the wall of the pipe to be renovated. This can be a material from which the wall is constructed. It is also conceivable, however, for such a material to be applied to the inner side of the wall of the pipe to be renovated before the hardenable fluid is flung against it.

By applying the device according to the present invention, hardenable plastic can be applied as a coating to the inner side of the wall of the tubular construction. A fluid-tight coating can hence be applied in tubular constructions in general and the above-mentioned side connections in particular, which at present cannot be cost-effectively provided with a "liner" according to the second known technique as described in the foregoing. With the aid of a device according to the present invention, tubular constructions having an internal diameter of 28 mm or larger can be renovated, wherein especially indoor cutting work can be avoided or can at least be confined to a minimum. The applied plastics coating is especially suitable for tubular constructions having a diameter within the range of 28-100 mm, since the plastics coating could restore the static stability of such pipes. In the case of tubular constructions having a diameter greater than 100 mm, a "liner", as can be fitted by means of the above-described second known technique, is virtually always necessary for restoration of the static stability.

The applied plastics coating in an above-described side connection is applied such that this produces an overlap with a part of the "liner" which is fitted in the main pipe. A fluid-tight joint can hereby be achieved between the side connection and the main pipe. Furthermore, it will be clear to the person skilled in the art that the entire pipe section which extends between a sanitary fitting, such as a tap, or wash basin, and the main sewer can be renovated in a fluid-tight manner by use of a combination of the second known technique and a method making use of the device according to the present invention.

In an embodiment of the device according to the present invention, at least an element of the delivery head comprising the outlet is connectable to a drive unit for making the outlet perform a rotation movement in a first direction and/or in a second direction about a centre axis of the delivery head, the second direction being opposite to the first direction. A first coating of the hardenable plastic can hereby be applied, wherein at least the outlet of the delivery head, for example, performs a rotation movement in an anti-clockwise direction. A second coating of the hardenable plastic can subsequently be applied, wherein at least the outlet of the delivery head performs a rotation movement in a clockwise direction. Depending on the specific situation, it is also possible to rotate the outlet and/or the delivery head anti-clockwise and clockwise according to another predetermined pattern. It is also possible for the outlet to rotate anti-clockwise about the centre axis of the delivery head, whilst the rest of the delivery head rotates clockwise about its centre axis.

The drive unit can comprise an electric motor and high-frequency controller coupled thereto. The electric motor is provided, for example, with a shaft, which comprises both a first shaft part, extending on the left-hand side of the electric motor, and a second shaft part, extending on the right-hand side of the electric motor. To one of these continuous shaft parts can be coupled a connection element such as a rod or the like, which is additionally connected to the delivery head. By coupling the connection element to the first shaft part or to the second shaft part, at least the outlet of the delivery head can be made to perform a rotation movement in an anti-clockwise direction or a clockwise direction. By means of, for example, the high-frequency controller, the rotation speed at which the rotation movement is performed by the outlet can be controlled in a stepless manner. This could also be achieved, for example, via a so-called programmable logic controller or plc. In practice, a length of the connection element can be chosen such as to be at least the same as a distance between an entrance of a pipe system in which the device according to the present invention is used and a position in the pipe system where the delivery head is supposed to be during operation, which may be in an order of several meters, up to 10 meters or more. It is also possible to take measures for putting the electric motor at a position in the pipe system in order to avoid the use of a very long connection element in certain situations, so that the rotation movement can still be realized in an effective manner.

In an embodiment of the device according to the present invention, the supply chamber is connectable to a first and a second storage chamber for containing a first and a second component of the hardenable plastic, respectively, wherein the pump, furthermore, is arranged to transport the first and the second component of the hardenable plastic from the first and the second storage chamber to the supply chamber via at least a first and a second line, respectively. It is hereby possible to use a hardenable plastic comprising a first and a second component. An example of a hardenable plastic of this type is a thermosetting plastic such as an epoxy resin. By means of the high-frequency controller, for example, a speed of plungers of the pump can be controlled in a stepless manner. A quantity of the epoxy resin can hence be influenced. In view of the different diameters of the pipework to be renovated, this is advantageous for realizing a uniform structure of the applied hardenable plastics coating on the inner side of the wall of the different lines. This could also be achieved, for example, via a so-called programmable logic controller or plc.

The first and the second component of the epoxy resin can be stored in respectively the first and the second storage chamber of the device according to the present invention, before being transported by the pump to the supply chamber via respectively the first and second line.

In an embodiment of the device according to the present invention, the device further comprises a third storage chamber enclosing the first and the second storage chamber, wherein the third storage chamber is provided with a temperature controller and is adapted to contain a fluid which is intended to be in heat-exchanging contact with an outside of the first and the second storage chamber. The temperature of the fluid to be used, for example water or coolant, can be kept at a desired value by means of the temperature controller. The fact that the fluid is put in heat-exchanging contact with the outer wall of the first and the second storage chamber means that the possibly steplessly adjustable temperature of the fluid is transmitted to the first and the second component of the hardenable plastic. In other words, the hardenable plastic, for example an epoxy resin, can be kept at a presettable temperature such that the viscosity and reaction time of the hardenable plastic and/or the first and the second component can be influenced. The viscosity is of importance for preventing the outflow (expulsion) of the hardenable plastic applied to the inner side of the wall of the tubular construction. The reaction time is of importance for being able to monitor premature hardening or too slow hardening.

In an embodiment of the device according to the present invention, the device comprises a rotatably arranged elongated element such as a rod which at least partially extends inside the supply chamber, and which is arranged to connect the drive unit to at least an element of the delivery head comprising the outlet, for rotating the element. The elongated element extends through a member for closing an end of the supply chamber, wherein it is advantageous to have a worm wheel part which is arranged around a portion of the elongated element as present in the end closing member. By having such a worm wheel part and adapting a direction of the thread of the worm wheel part to a rotation direction of the elongated element, a sealing function of the worm wheel part is obtained, whereby leakage of fluid through the end closing member is prevented. During rotation, at the location of the worm wheel part, the hardenable plastic is forced to flow away from the end closing member as a result of interaction with the thread. Applying a worm wheel part is a very effective way of realizing a sealing function, which is reliable and does not require a use of complicated and expensive elements.

The application of the worm wheel part is not necessarily dependent on having a flexible wall of the supply chamber. Hence, the present invention additionally provides a device for applying a coating of hardenable plastic to an inner side of a wall of a tubular construction, for example a sewing pipe, comprising a supply chamber for containing a hardenable plastic, a delivery head comprising an outlet for letting out the hardenable plastic from the delivery head, and a pump for transporting the hardenable plastic from the supply chamber to the outlet, wherein the outlet is movable to various angular positions with respect to a rotation axis, for allowing the hardenable plastic to be let out of the delivery head at various angular positions with respect to the rotation axis, wherein at least an element of the delivery head comprising the outlet is connectable to a drive unit for making the outlet perform a rotation movement in a first direction and/or in a second direction about a centre axis of the delivery head, the second direction being opposite to the first direction, wherein the device further comprises a rotatably arranged elongated element which partially extends inside the supply chamber, and which is arranged to connect the drive unit to at least an element of the delivery head comprising the outlet, for rotating the element, wherein the elongated element extends through a member for closing an end of the supply chamber, and wherein a worm wheel part is arranged around a portion of the elongated element as present in the end closing member.

The elongated element may comprise two non-aligned portions, wherein a longitudinal axis of only one portion coincides with the centre axis of the delivery head, and wherein the portions are flexibly connected to each other. In this way, it is very well possible for the elongated element to have a function in stirring and mixing the components of the hardenable plastic inside the supply chamber while rotating and twisting.

It is also possible that the elongated element is provided in the form of a spiral element such as a spring. For example, the device may comprise a spiral element which is positioned partially in the supply chamber and extends all the way to the drive unit. In that case, it is possible to mix the first and the second component of an epoxy resin, for example, in the supply chamber as a result of rotation of the spiral element. The mixing of the first and the second component can be achieved independently of the rotational direction of the spiral element.

According to an aspect of the present invention, another way of achieving an efficient mixing process inside the supply chamber involves applying an open-type-bearing in which a chamber accommodating at least one ball of the bearing is at least partially open. Hence, it is advantageous for the device according to the present invention to comprise such a bearing, wherein the bearing can be positioned on a rotatable element inside the supply chamber. In the supply chamber, the components of the hardenable plastic are mixed and moved from inlets of the supply chamber to the outlet of the supply chamber at the same time. The bearing can be put at a position between the inlets and the outlet in order to let the at least one moving ball of the bearing interact with the mixture passing through the open chamber of the bearing.

The application of the open-type-bearing is not necessarily dependent on having a flexible wall of the supply chamber. Hence, the present invention additionally provides a device for applying a coating of hardenable plastic to an inner side of a wall of a tubular construction, for example a sewing pipe, comprising a supply chamber for containing a hardenable plastic, a delivery head comprising an outlet for letting out the hardenable plastic from the delivery head, and a pump for transporting the hardenable plastic from the supply chamber to the outlet, wherein the outlet is movable to various angular positions with respect to a rotation axis, for allowing the hardenable plastic to be let out of the delivery head at various angular positions with respect to the rotation axis, and wherein the device further comprises a bearing which is positioned on a rotatable element inside the supply chamber, wherein the bearing is an open-type-bearing in which a chamber accommodating at least one ball of the bearing is at least partially open.

In an embodiment of the device according to the present invention, especially in case the elongated element is provided in the form of a spiral element, the spiral element is housed outside the supply chamber in a third line. As a result, the spiral element can hence be shielded from the environment and can be protected from damage, for example.

In an embodiment of the device according to the present invention, the first, second and third line are surrounded by a fourth line to form a line assembly which can be used to position at least the delivery head in the tubular construction to be renovated. The fourth line here serves, where necessary, as a kind of outer casing for protection of the lines which are housed therein.

In an embodiment of the device according to the present invention, the supply chamber is at least partially integrated in the delivery head. The distance between the supply chamber and the outlet of the delivery head can hereby be made as small as possible. Depending on the properties of the used hardenable plastic, it may be important for the hardenable plastic to be transported via as short a connection as possible, such as a line, in order to prevent or significantly reduce blockage of the line. In order to achieve an efficient renovation process, it is important that the device must not be disabled, or be disabled as little as possible, owing to a blockage, for example, of a line or the outlet of the delivery head, as a result of, for example, premature hardening.

The positioning of the delivery head by means of the line assembly can be realized both manually and mechanically. The introduction of the delivery head into the tubular construction to be renovated will usually be realized manually. The displacement of the delivery head during the application of the hardenable plastic will preferably be realized mechanically in order to obtain an as even as possible distribution of the plastic on the inner side of the wall of the tubular construction.

In an embodiment of the device according to the present invention, the device comprises a camera which is arranged at a position for allowing the delivery head to be positioned at a starting position in the tubular construction. The delivery head, after having been introduced into the tubular construction, can hence be positioned, via an opening providing access to the inner side of the wall of the tubular construction, at a starting position which is generally situated as close as possible to an end of the pipe part to be renovated, which end is connected to a sanitary fitting, such as a tap, wash basin, kitchen sink, wall-mounted toilet, bath tub or shower tray. It will be clear to the person skilled in the art that the starting position can also be chosen at a different location. However, it is most practical to provide the pipe fully with a plastics coating during the renovation process.

As described above, the applied plastics coating in a side connection is applied in such a way that it overlaps with a part of the "liner" which, for the renovation, is fitted in the main pipe into which the side connection opens. The camera can be used to view the progress and the result of the renovation process. In addition, it is possible to determine on the basis of the colour of the used hardenable plastic, for example, whether the hardening thereof is alright.

Furthermore, the camera can also be positioned in the delivery head. A camera cable, which extends between the camera and a monitor or data storage unit, can further be added to the above-described line assembly.

In an embodiment of the device according to the present invention, the device comprises a centering element for centering the delivery head in the tubular construction. It can hereby be achieved that the hardenable plastic is applied evenly to the inner side of the wall of the tubular construction.

In an embodiment of the device according to the present invention, the camera is adapted to be positioned on the centering element. This can enable the camera to be directed in different directions in order to produce images of the working environment. This can be advantageous, for example, in a process of maneuvering the delivery head through the tubular construction to be renovated.

The present invention also relates to the supply chamber as such, which is defined as a supply chamber for use in a device for applying a coating of hardenable plastic to an inner side of a wall of a tubular construction, for example a sewage pipe, which supply chamber is adapted to contain a hardenable plastic and to supply the hardenable plastic to a delivery head comprising an outlet for letting out the hardenable plastic from the delivery head, and which supply chamber comprises a flexible wall in the form of a flexible sleeve.

As explained in the foregoing, the supply chamber may comprise a rotatably arranged elongated element extending inside the supply chamber. In practice, the elongated element is arranged such as to extend in a longitudinal direction of the flexible sleeve. The elongated element may be entirely flexible as well. Furthermore, it is possible for the elongated element to extend through a member for closing an end of the supply chamber, wherein a worm wheel part is arranged around a portion of the elongated element as present in the end closing member for obtaining excellent sealing of the supply chamber at the end closing member which is provided with an opening for allowing the elongated element to pass. The elongated element may comprise two non-aligned portions which are flexibly connected to each other, whereby a mixing effect on components of hardenable plastic in the supply chamber can be realized. The elongated element may comprise a rod-like element, for example, but may also comprise a spiral element. An open-type-bearing may be applied inside the supply chamber, whereby a further mixing effect is obtained at the same time.

The present invention furthermore relates to an assembly of a supply chamber as mentioned in the foregoing and the cover element of the delivery head of the device according to the present invention. The assembly is defined as an assembly of a supply chamber and a cover element, wherein the supply chamber comprises a rotatably arranged elongated element extending inside the supply chamber, wherein the cover element comprises an outlet, and wherein the cover element is rotatably arranged at an end of the supply chamber and connected to the elongated element.

According to another aspect of the present invention, a method is provided for applying a hardenable plastics coating to an inner side of a wall of a tubular construction, for example a sewage pipe, by means of a device according to the invention as described in the foregoing, the method comprising:

positioning a delivery head of the device at a starting position in the tubular construction via an opening providing access to the inner side of the wall of the tubular construction, operating a pump of the device for transporting the hardenable plastic from a supply chamber to an outlet of the delivery head, operating a drive unit of the device for making the outlet perform a rotation movement about a rotation axis at a predetermined rotation speed for applying the hardenable plastics coating to the inner side of the wall of the tubular construction at the site of the starting position, and displacing the delivery head along a path extending between the starting position in the tubular construction and the opening providing access to the inner side of the wall of the tubular construction, for the application of the hardenable plastics coating to the inner side of the wall of the tubular construction.

By carrying out the above-described method, the hardenable plastic is flung against the inner side of the wall of a tubular construction to be renovated. After hardening of the plastic, a coherent plastics coating, which restores the fluid-tightness of the tubular construction, is obtained. As described above, it is possible to use a hardenable plastic which is hardened by the passage of warm water and/or steam, for example, along the same. As already noted, it is also possible to use a hardenable plastic which hardens as a result of, for example, a chemical reaction which arises between the hardenable plastic and a material contained in the wall of the pipe to be renovated. This can be a material from which the wall is constructed. It is also conceivable, however, for such a material to be applied to the inner side of the wall of the pipe to be renovated before the hardenable fluid is flung against it.

As already described above, the positioning of the delivery head by means of the line assembly can be realized both manually and mechanically. The introduction of the delivery head into the tubular construction to be renovated will usually be realized manually. The displacement of the delivery head by means of the retraction of the line assembly during the application of the hardenable plastic will preferably be realized mechanically in order to obtain an as even as possible distribution of the plastic on the inner side of the wall of the tubular construction.

The mechanical displacement of the delivery head as a result of the retraction of the line assembly can be effected, for example, by the coupling of an electric motor, provided with a high-frequency controller, to rollers between which the line assembly is mounted. By pressing together of the rollers, a force is exerted on the outer casing of the line assembly, whereby the line assembly is retracted. By means of the high-frequency controller, for example, the drive speed of the line assembly, and herewith the working speed of the delivery head, can be controlled in a stepless manner. This could also be achieved, for example, via a so-called programmable logic controller (plc).

By using this method from different lead-in points, it is possible to make the hardenable plastic to be applied overlapping at so-called T-pieces and other junction points. At the same time, an overlap can be created between the applied plastics coating in a side connection and a part of the "liner" which, for the renovation, is fitted in the main pipe into which the side connection opens.

In a way of carrying out the method according to the present invention, assuming that a hardenable plastic comprising a first and a second component is used, the method additionally comprises:

operating the pump of the device for transporting the first and the second component of the hardenable plastic from respectively a first and a second storage chamber to the supply chamber via respectively a first and a second line, mixing the first and the second component of the hardenable plastic, according to a predetermined mixing ratio, in the supply chamber, for obtaining a mixed hardenable plastic, and transporting the mixed hardenable plastic from the supply chamber to the outlet of the delivery head.

Where a hardenable plastic comprising a first and a second component is used, it is advantageous to add the above steps to the above-described method, since the hardenable plastic which is finally to be applied needs to be mixed before this is flung against the inner side of the wall of the pipe to be renovated. As already stated above, an epoxy resin is an example of a hardenable plastic which can be used. It will be clear to the person skilled in the art that other plastics or substances could also possibly be used. The use hereof falls within the boundaries of the present inventive concept. The first and the second component of the epoxy resin, which is described as a non-limiting example, are stored in respectively the first and the second storage chamber of the device according to the present invention. By means of a pump, such as a high pressure or HD pump, both components can be transported to the supply chamber of the device via respectively the first and second line. In the supply chamber, the first and the second component of the hardenable plastic are mixed according to a predetermined mixing ratio. The mixed epoxy resin which is thus obtained is subsequently transported to the outlet of the delivery head. As a result of the pressure which the pump exerts on the hardenable plastic and/or by rotation of at least the outlet of the delivery head or as a result of rotation of the delivery head, the hardenable plastic is flung against the inner side of the wall of the tubular construction to be renovated.

In a way of carrying out the method according to the present invention, the method further comprises:

filling the first and the second storage chamber with respectively the first and the second component of the hardenable plastic, creating an underpressure in the first and the second storage chamber after filling thereof, in order to expel gas pockets which are formed during the filling of the first and the second storage chamber in respectively the first and the second component of the hardenable plastic, and creating and maintaining a predetermined pressure in respectively the first and the second storage chamber before respectively the first and the second component of the hardenable plastic is transported by the pump to the supply chamber.

The first and the second storage chamber, but preferably also the supply chamber, are constructed as climatized vessels. An advantage hereof is that the working properties of the first and the second component and of the mixed hardenable plastic can be kept substantially stable. This is especially important with respect to the viscosity of the above-mentioned fluids and the reaction times.

In order to obtain a mixed hardenable plastic which is free from gas pockets, in the first and in the second storage chamber, after these have been filled with respectively the first and the second component of the hardenable plastic, an underpressure is created. To this end, a possibly electrically driven vacuum pump can be used. Next, the first and the second storage chamber are brought and kept under a predetermined pressure. To this end, a possibly electrically driven gas compressor, for example, can be used. After this, the first and the second component of the hardenable plastic are transported to the HD pump via separate lines. Next, the first and the second component are transported from the HD pump to the supply chamber via respectively the first and the second line of the line assembly. In the supply chamber, the first and the second component are mixed. Hereafter, the mixed hardenable plastic is flung against the inner side of the wall of a pipe to be renovated.

In a way of carrying out the method according to the present invention, the drive unit comprises an elongated element which is connected to at least an element of the delivery head, wherein the outlet of the delivery head is made to perform a rotation movement in a first direction and/or in a second direction about the centre axis of the delivery head, the second direction being opposite to the first direction. For this purpose, the elongated element is connected, for example, to a shaft coupled to an electric motor. The shaft comprises, for example, a first shaft part, extending on the left-hand side of the electric motor, and a second shaft part, extending on the right-hand side of the electric motor. By coupling the elongated element to the first shaft part or to the second shaft part, at least the outlet of the delivery head can be made to perform a rotation movement in an anti-clockwise direction or a clockwise direction.

Irrespective of the rotational direction of the elongated element, it is also possible to mix the first and the second component of, for example, an epoxy resin in the supply chamber.

In a way of carrying out the method according to the present invention, the outlet of the delivery head is made to perform a rotation movement at a rotation speed which is controllable in a stepless manner by means of, for example, a high-frequency controller coupled to the electric motor. This could also be achieved, for example, via an above-mentioned plc.

In a way of carrying out the method according to the present invention, the delivery head is positioned in a camera-controlled manner in the tubular construction. It is hereby possible to accurately position the delivery head at a starting position in a side connection connecting by one end to a sanitary fitting, wherein the starting position can be achieved via a line section which is accessible via a main pipe.

In a way of carrying out the method according to the present invention, the hardenable plastic, in the form of a first coating, is applied to the inner side of the wall of the tubular construction by displacement of the delivery head along a path extending between the starting position in the tubular construction and the opening providing access to the inner side of the wall of the tubular construction, wherein the outlet of the delivery head is made to perform a rotation movement in a first direction about the centre axis of the delivery head. The delivery head can here be displaced both manually and mechanically by means of the displacement of the line assembly connected to the delivery head. In order to obtain an as even as possible distribution of the plastic on the inner side of the tubular construction to be renovated, a mechanical displacement is preferable.

The mechanical displacement of the delivery head as a result of the retraction of the line assembly can be effected, for example, by the coupling of an electric motor, provided with a high-frequency controller, to rollers between which the line assembly is mounted. As a result of the pressing together of the rollers, a force is exerted on the outer casing of the line assembly, whereby the line assembly is retracted. For example by means of the high-frequency controller, the drive speed of the line assembly, and herewith the working speed of the delivery head, can be controlled in a stepless manner. This could also be achieved, for example, via a plc, already mentioned above.

In a way of carrying out the method according to the present invention, the method further comprises the application of a second coating of hardenable plastic by once again displacing the delivery head along the above-mentioned path in the tubular construction, wherein the outlet of the delivery head is made to perform a rotation movement in a second direction about the centre axis of the delivery head, the second direction being opposite to the first direction. It will be clear to the person skilled in the art that, if desired or necessary, a plurality of coatings can be successively applied, wherein at least the outlet of the delivery head is made to perform a rotation movement alternately in an anti-clockwise direction or a clockwise direction.

In a way of carrying out the method according to the present invention, the hardenable plastic comprises an epoxy resin comprising a first and a second component, which components are mixed in a mixing ratio of 2:1. For this purpose, the HD pump can comprise, for example, three plungers, which are separated in proportion to the mixing ratio 2:1. That means that two plungers are used for the first component and one plunger is used for the second component. As a result of this separation in the pump and the use of the drive of the pump to drive the plungers, a constant mixing ratio can be generated. Advantageously, the mixing ratio is within a range of 2:1-4:1.

According to the present invention, the configuration of the HD pump as adjusted to the mixing ratio to be achieved can be obtained by using a standard plunger pump and closing at least one chamber and/or joining together at least two chambers. In the example relating to a mixing ratio 2:1, a plunger pump comprising four chambers can be used, wherein one chamber is closed, and wherein two chambers are joined together. Thus, the present invention also relates to a method for providing a pump which is suitable for realizing a predetermined mixing ratio of mixture components to be pumped, wherein a standard pump comprising a predetermined number of chambers is provided, wherein at least one of the chambers is closed and/or at least two chambers are joined together in order to achieve a volume ratio of the chambers which corresponds to the mixing ratio. Furthermore, it is noted in respect of the application of a plunger pump that it is advantageous to replace the standard valves with more robust ball-based valves.

According to another aspect of the present invention, a set of a coating applying device as described in the foregoing and a cleaning device is provided. In particular, the invention relates to a set of a device for applying a coating of hardenable plastic to an inner side of a wall of a tubular construction, for example a sewage pipe, as described in the foregoing and a device for cleaning the supply chamber and at least an element of the delivery head comprising the outlet of the delivery head of the coating applying device, wherein the cleaning device comprises means for supplying a cleaning fluid to the supply chamber and at least the element of the delivery head comprising the outlet of the delivery head of the coating applying device. For sake of completeness, in respect of the coating applying device as described in the foregoing, it is noted that this device is one of a range of devices including a coating applying device in which the supply chamber comprises a flexible wall, a first variant according to which the supply chamber of the coating applying device does not necessarily need to comprise a flexible wall, but in which the device comprises a worm wheel part for performing a sealing function on the supply chamber, and a second variant according to which the supply chamber of the coating applying device does not necessarily need to comprise a flexible wall, but in which the device comprises an open-type-bearing for enhancing a mixing effect inside the supply chamber.

By performing a cleaning action on the supply chamber and at least the element of the delivery head comprising the outlet of the delivery head, a situation in which clogging due to hardened plastic occurs is avoided, wherein it is possible to use the elements as mentioned more than one time. In practice, it is very advantageous for the cleaning process to take place automatically in a device which is adapted to receive the elements as mentioned and make cleaning fluid flow through these elements.

The means for supplying the cleaning fluid may comprise two lines which are adapted to be connected to inlets of the supply chamber of the coating applying device for letting in components of the hardenable plastic to the supply chamber during operation of the coating applying device. Hence, the cleaning fluid can be made to follow the same path through the supply chamber and the delivery head of the coating applying device as the components of the hardenable plastic and the hardenable plastic which is obtained on the basis of the components. Preferably, the cleaning device further comprises driving means for making the elements of the coating applying device perform a rotation movement during a cleaning action. By having a rotation movement, the effect of the cleaning action is enhanced, wherein the cleaning fluid is made to flow more vigorously through the elements. In a practical embodiment, the driving means of the cleaning device comprise a combination of an electric motor and a rotation spring connected to an output shaft of the electric motor.

The rotation movement does not necessarily need to be continuous throughout an entire cleaning action. In this respect, it is noted that within the framework of the present invention, it is possible for the cleaning device to be adapted to perform the cleaning action according to at least one programme, wherein movements of the elements to be cleaned are realized according to a predetermined schedule. If so desired, the cleaning device may be adapted to allow a user to choose certain settings of a cleaning action.

Although the various aspects of the invention will be further described with reference to specific embodiments, the invention is not limited to the shown embodiments. The invention is described on the basis of measures, wherein explicit advantages can be stated but implicit advantages can also apply. The subject of the invention of the present application or of a divisional application can relate to each of these measures, some combinations of which are explicitly described and/or shown in this description, but which can also be implicitly described. Although the figures show explicit combinations of measures, it will be clear to the person skilled in the art that a number of the measures can also be taken in isolation.

BRIEF DESCRIPTION OF THE DRAWING FIGURES

Figure 4:
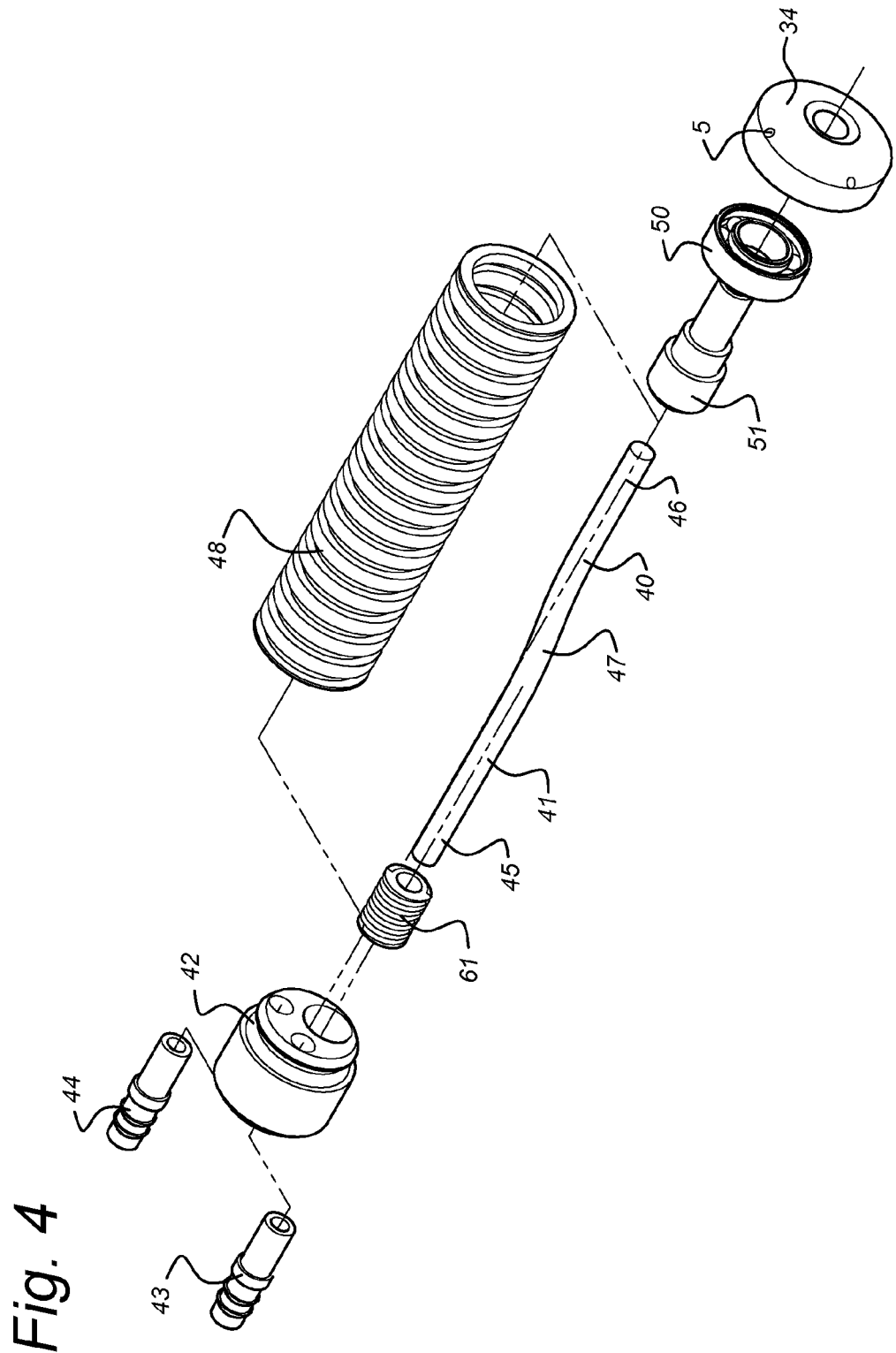

FIG. 4 diagrammatically shows a number of elements of another embodiment of a device according to the present invention for applying a coating of hardenable plastic to an inner side of a wall of a tubular construction.

Figure 5:
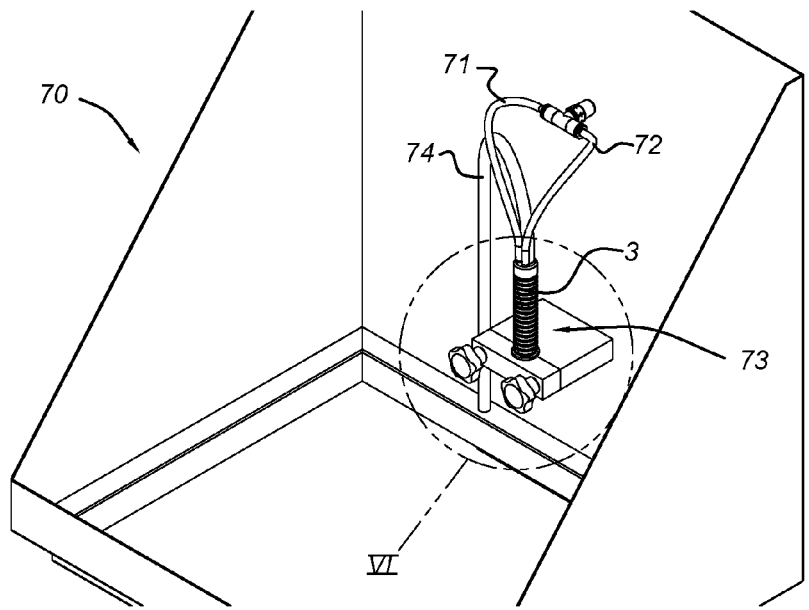

FIG. 5 shows a schematic perspective view of an embodiment of a device for cleaning elements of the coating applying device.

Figure 6:
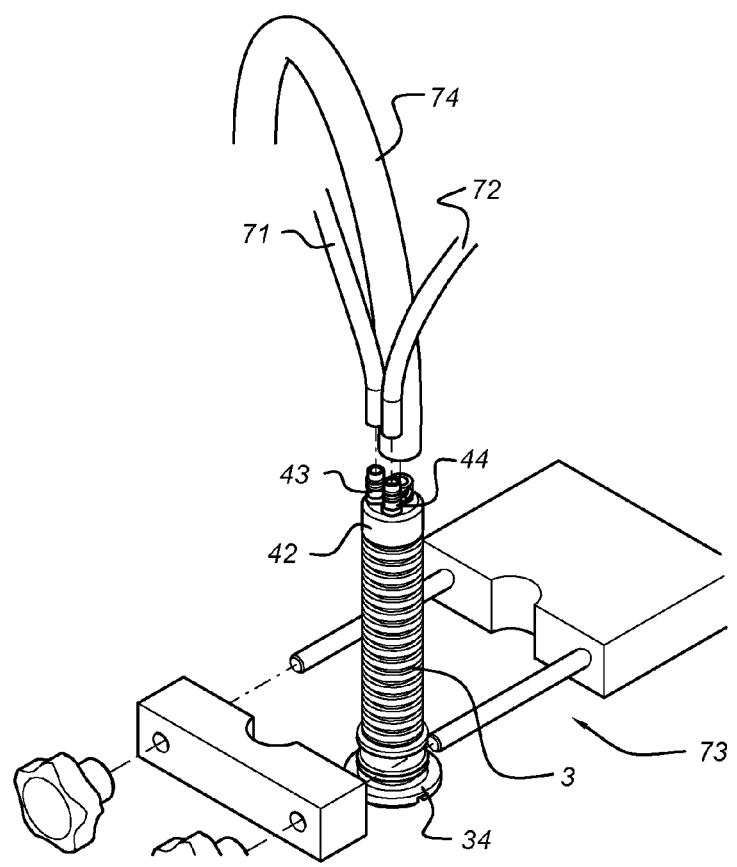

FIG. 6 shows a detail of FIG. 5.

The figures are not necessarily drawn to scale. Identical or similar parts can be denoted in the different figures with the same references.

DETAILED DESCRIPTION OF THE INVENTION

Figure 1:
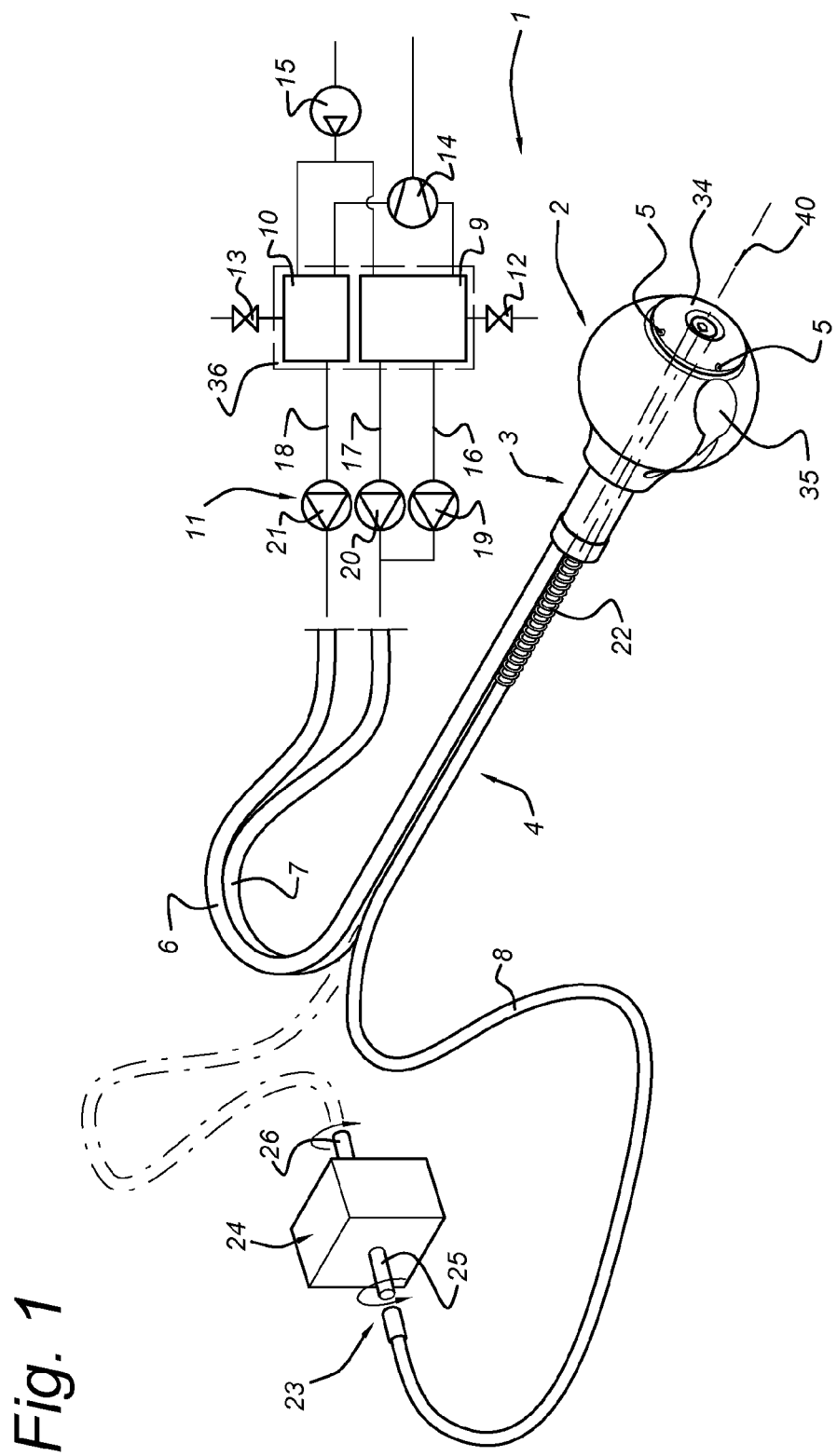
FIG. 1 shows a schematic perspective view of an embodiment of a device according to the present invention for applying a coating of hardenable plastic to an inner side of a wall of a tubular construction.

FIG. 1 shows a delivery head 2 and a supply chamber 3 of a coating applying device 1 according to the present invention. The supply chamber 3 is in this embodiment positioned right behind the delivery head 2. The distance between the supply chamber 3 and the outlet 5 of the delivery head 2 can hereby be kept as small as possible. Depending on the properties of the used hardenable plastic, it may be important for the hardenable plastic to be transported via as short a connection as possible in order to prevent or significantly reduce blockage of the connection. In order to achieve an efficient renovation process, it is of importance that the coating applying device 1 must not be disabled, or be disabled as little as possible, owing to a blockage, for example, of a connection or of the outlet 5 of the delivery head 2.

According to the embodiment of the delivery head 2 according to the present invention, the outlet is formed by openings 5 in a cover element 34 positioned on the outer periphery of the spherical delivery head 2, which cover element 34 is generally disc-shaped in the shown example. It will be clear to the person skilled in the art that other implementations of the outlet 5 which fall within the inventive concept of the present invention are possible. In this context, it is possible for the cover element 34 to be implemented such that it is rotatable with respect to the rest of the delivery head 2.

As shown in FIG. 1, the embodiment of the coating applying device 1 comprises a line assembly 4 comprising a first line 6, a second line 7 and a third line 8. Not shown is a fourth line, which, where necessary, can be fitted as an outer casing around the first 6, second 7 and third 8 line.

The supply chamber 3 can be connected to a first 9 and a second 10 storage chamber, which respectively comprise a first and a second component of the hardenable plastic. As indicated in FIG. 1, a third storage chamber 36 can enclose the first 9 and the second 10 storage chamber. The third storage chamber 36 is provided with a temperature controller and comprises a fluid which is in heat-exchanging contact with an outside of the first 9 and the second 10 storage chamber. The temperature of the fluid, for example water or coolant, can be set by means of the temperature controller to a desired value and kept at this. The fact that the fluid is in heat-exchanging contact with the outer wall of the first 9 and the second 10 storage chamber means that the possibly steplessly adjustable temperature of the fluid is transmitted to the first and the second component of the hardenable plastic. In other words, the hardenable plastic, for example an epoxy resin, can be kept at a presettable temperature such that the viscosity and reaction time of the hardenable plastic and/or the first and the second component can be influenced. The viscosity is of importance for preventing the outflow (expulsion) of the hardenable plastic applied to the inner side of the wall 29 of the tubular construction 27. The reaction time is of importance for being able to monitor premature hardening or too slow hardening.

The coating applying device 1 according to the present invention further comprises a pump 11, for example a HD pump, which is arranged to transport the first and the second component of the hardenable plastic from respectively the first 9 and the second 10 storage chamber to the supply chamber 3 via respectively the first 6 and the second line 7. It is hereby possible to use a hardenable plastic comprising a first and a second component. An example of a hardenable plastic of this type is a thermosetting plastic such as an epoxy resin. The first and the second component of the epoxy resin can here be stored in respectively the first 9 and the second 10 storage chamber of the coating applying device 1 according to the present invention, before being transported by the pump 11 to the supply chamber 3 via respectively the first 6 and the second 7 line.

In order to obtain a mixed hardenable plastic which is free from gas pockets, in the first 9 and in the second 10 storage chamber, after these have been filled with respectively the first and the second component of the hardenable plastic via a first valve 12 and a second valve 13 respectively, an underpressure is created. To this end, a possibly electrically driven vacuum pump 14, for example, can be used. Next, the first 9 and the second 10 storage chamber are brought and kept under a predetermined pressure. To this end, a possibly electrically driven gas compressor 15, for example, can be used. After this, the first and the second component of the hardenable plastic are transported to the HD pump 11 via separate lines 16-18.

For the mixing of the first and the second component of the hardenable plastic according to a mixing ratio of 2:1, chosen as a non-limiting example, the HD pump 11 comprises three plungers 19-21, which are separated proportionally to the mixing ratio 2:1. Plungers 19, 20 are used for the first component and plunger 21 is used for the second component. As a result of this separation in the pump 11 and the use of the drive of the pump to drive the plungers 19-21, a constant mixing ratio can be generated. The HD pump 11 can be custom made, but it is preferred to have an HD pump 11 which is made by using a standard plunger pump comprising four chambers, wherein one chamber is closed and two other chambers are joined together, so that the mixing ratio 2:1 is realized through the volume ratio which is obtained as a result of doing so. Furthermore, the standard valves of such a standard pump may be replaced with ball-based valves.

During operation of the coating applying device 1, the first and the second component are transported to the supply chamber 3 via respectively the first 6 and the second 7 line of the line assembly 4. In the supply chamber 3, the first and the second component are mixed.

FIG. 1 shows a spiral element 22, for example a spring, which is connected to the delivery head 2 such that the cover element 34 of the delivery head 2, and thus the openings 5 which form the outlet, can be rotated in a first direction and/or in a second direction about the centre axis 40 of the delivery head 2. The second direction is here directed oppositely to the first direction. In the embodiment according to FIG. 1, the spiral element 22 is connected to a shaft 23 coupled to an electric motor 24. The shaft 23 comprises a first shaft part 25, extending on the left-hand side of the electric motor 24, and a second shaft part 26, extending on the right-hand side of the electric motor 24. By coupling the spiral element 22 to the first shaft part 25 or to the second shaft part 26, at least the cover element 34 of the delivery head 2 can be rotated anti-clockwise or clockwise. It will be clear to the person skilled in the art that it is also possible to arrange the delivery head 2 such that this is rotatable about its centre axis 40.

As shown in FIG. 1, the spiral element 22 is at least partially positioned in the supply chamber 3. It is hereby possible to mix the first and the second component of, for example, an epoxy resin in the supply chamber 3 as a result of rotation of the spiral element 22. The mixing of the first and the second component can be achieved irrespective of the rotational direction of the spiral element 22.

FIG. 1 further shows that the spiral element 22 is housed outside the supply chamber 3 in a third line 8 of the line assembly 4. The spiral element 22 can hence be shielded from the environment and can be protected from damage, for example.

FIG. 1 further shows that the delivery head 2 is provided with a receiving chamber 35, in which a camera (otherwise not shown) can be housed. It can hereby be achieved that the camera records images of the working environment. This can be advantageous, for example, in the maneuvering of the delivery head 2 through the tubular construction to be renovated. The camera can additionally be used to check whether the hardenable plastic is being applied to the inner side of the wall of the tubular construction. Should the hardenable plastic to be applied comprise at least two components, then it is also possible with the aid of camera images to examine whether the hardenable plastic is well mixed. The colour of the mixed hardenable plastic can be a gauge to this end.

Figure 2:
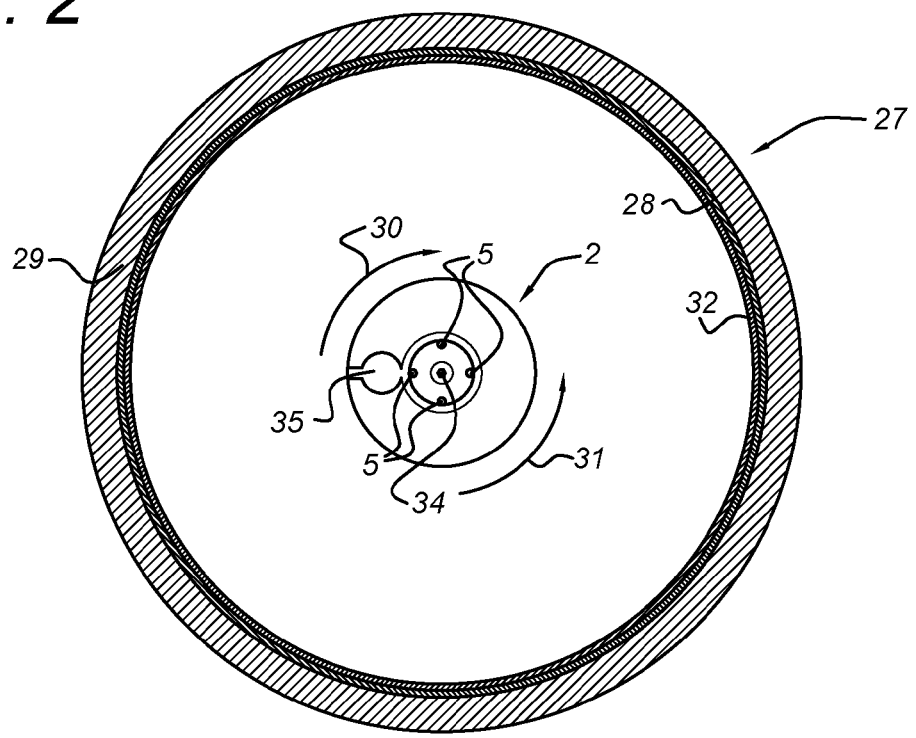
FIG. 2 shows a schematic front view of a delivery head of the device according to FIG. 1, wherein the delivery head is positioned in a tubular construction to be renovated.

FIG. 2 shows a schematic front view of a delivery head 2 of the coating applying device 1 according to FIG. 1, wherein the delivery head 2 is positioned in a tubular construction 27 to be renovated for the application of a first coating 28 of hardenable plastic to the inner side of a wall 29 of the tubular construction 27 by rotation of at least the cover element 34 of the delivery head 2 about its centre axis

40 in the direction of the arrow 30. By rotating at least the cover element 34 of the delivery head 2 about its centre axis 40 in the direction of the arrow 31, which direction is directed oppositely to the direction of the arrow 30, it is possible to apply a second coating 32 of hardenable plastic. After hardening of at least one of the applied coatings 28; 32 of hardenable plastic, the inner side of the wall 29 of the tubular construction 27 is fluid-tight again.

Figure 3:
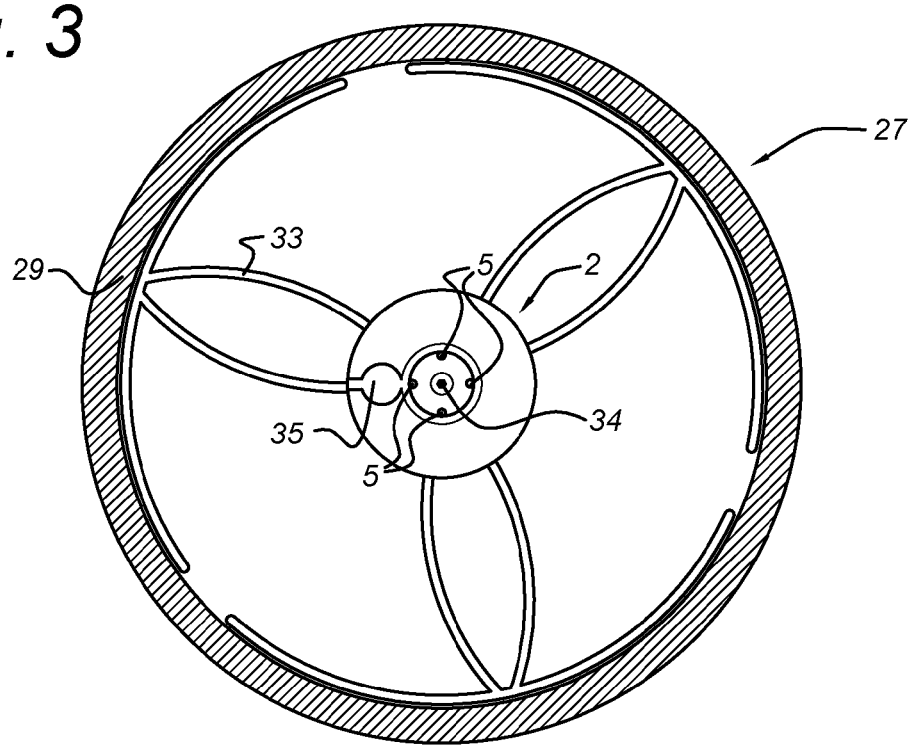
FIG. 3 shows a schematic front view of a delivery head of the device according to the previous figures, which is positioned in a tubular construction to be renovated, wherein a centering element is also provided.

FIG. 3 shows a schematic front view of a delivery head 2 of the coating applying device 1 according to the previous figures, which is positioned in a tubular construction 27 to be renovated, with the further provision of a centering element 33. The centering element 33 is connected to the coating applying device 1 and fitted in the tubular construction 27 such that the delivery head 2 is centred in the tubular construction 27. The centering element 33 is here in bearing contact with the inner side of the wall 29 of the tubular construction 27. In an embodiment of the centering element 33, the centering element 33 can be adapted to the internal diameter of the tubular construction 27 such that the centering element 33 is constantly in bearing contact with the inner side of the wall 29 of the tubular construction 27. The centering of the delivery head 2 enables the hardenable plastic to be evenly applied to the inner side of the wall 29 of the tubular construction 27. It will be clear to the person skilled in the art that it is also possible to shape the delivery head 2 such that it serves as a centering head.

FIG. 4 diagrammatically shows a number of elements of another embodiment of a coating applying device according to the present invention. A difference between the embodiments resides in the fact that different types of elements are used for connecting the electric motor 24 to the cover element 34 of the delivery head 2. FIG. 4 relates to the use of a rod-like element 41 instead of the use of a spiral element 22 for driving the cover element 34 comprising the openings 5 for letting out the hardenable plastic. In particular, the rod-like element 41 extends through an end closing member 42 of the supply chamber 3, which is a member 42 which serves for closing an end of the supply chamber 3 as present at the side where the components of the hardenable plastic are supplied to the supply chamber 3, and which comprises inlets 43, 44 for letting in those components to the supply chamber 3. The rod-like element 41 comprises two non-aligned portions 45, 46 which are flexibly connected to each other through an intermediate portion 47 of the rod-like element 41. A portion 45 as extending through the end closing member 42 has an eccentric arrangement with respect to the centre axis 40 of the delivery head and the centre axis of the supply chamber 3, whereas a longitudinal axis of a portion 46 as connected to the cover element 34 coincides with the centre axes as mentioned. Hence, when the rod-like element is driven such as to rotate, the intermediate portion 47 flexes, which causes a mixing effect inside the supply chamber 3. The supply chamber 3 is furthermore provided with another end closing member (not shown), which comprises at least one opening for letting out the hardenable plastic to the cover element 34, and a flexible sleeve 48 extending between the end closing members. The flexible sleeve 48 defines a flexible wall of the supply chamber 3 which has a function in realizing optimal maneuverability of the coating applying device 1, whereby broad application of the device 1 is possible, even in relatively small-sized pipe systems which cannot be renovated by using known coating applying devices. In this respect, it is noted that it is very advantageous for at least an entire portion of the rod-like element 41 as present inside the supply chamber 3, i.e. a portion comprising the two non-aligned portions 45, 46 and the intermediate portion 47, to be flexible as well.

In the supply chamber 3, near the end closing member where the hardenable plastic is let out in the direction of the cover element 34 of the delivery head 2, an open-type bearing 50 is present on a rotatable element 51 inside the supply chamber 3, particularly an element 51 at a location near a connection of the rod-like element 41 and the cover element 34. It is noted that besides this element 51, other bushing-like elements (not shown) may be used in the supply chamber 3. It is furthermore noted that cover elements 34 of various sizes may be provided with a coating applying device 1, so that a user of the device 1 may choose an appropriate size depending on the size of the tubular construction 27 to be renovated.

In the shown example, a worm wheel part 61 is applied for surrounding the rod-like element 41 in the end closing member 42. When the rod-like element 41 is rotated, the worm wheel part 61 is rotated as well, as a result of which the worm wheel part 61 performs a sealing function at the end closing member 42, on the basis of which leakage from the supply chamber 3 at the position where the rod-like element 41 extends through the end closing member 42 is avoided. It is noted that the direction of the thread is adapted to the direction of rotation. If there is a need to change the direction of rotation, another worm wheel part 61 needs to be applied, wherein the direction of the thread of that other worm wheel part 61 is opposite to the direction of the thread of the worm wheel part 61 as applied first.

FIG. 5 shows a schematic perspective view of an embodiment of a device 70 for cleaning elements of the coating applying device 1, particularly a combination of the supply chamber 3 and the cover device 34 comprising the openings 5 for letting out the hardenable plastic, and FIG. 6 shows a details of FIG. 5. The cleaning device 70 is adapted to clean the elements by supplying cleaning fluid to the supply chamber 3 through the inlets 43, 44 of the supply chamber 3. To that end, the cleaning device 70 comprises two lines 71, 72 which are connectable to the inlets 43, 44 as mentioned. The cleaning device 70 may furthermore comprise pumping means (not shown) for making the cleaning fluid flow to the supply chamber 3, from a reservoir or the like (not shown), for example, in any suitable manner. Other elements of the cleaning device 70 as shown include a clamping arrangement 73 for retaining the elements 3, 34 to be cleaned during operation at the position of the sleeve 48 of the supply chamber 3 and a tube-like member 74 for accommodating a spring or the like (not shown) which is comparable to the spiral element 22 or the rod-like element 41 of the coating applying device 1, so that the same rotation movements can be realized at appropriate moments of a cleaning action to be performed by means of the cleaning device 70. Hence, the spring or similar element is part of driving means of the cleaning device 70, which may furthermore comprise a suitable drive unit (not shown) such as an electric motor.

It is noted that besides the elements as shown in FIG. 5 and FIG. 6, the cleaning device 70 may comprise further elements such as a tray or reservoir suitable for receiving cleaning fluid as let out from the elements of the coating applying device 1 to be cleaned during a cleaning action, one or more splashboards, etc. Such practical elements are omitted from the figures for sake of clarity.

The present invention is not limited to the embodiments which are described above as non-limiting examples. The scope of the protection is determined by the scope of the following claims, within the scope of which various modifications are conceivable.

An aspect of the present invention can be summarized as follows. A device 1 for applying a coating 28 of hardenable plastic to an inner side of a wall 29 of a tubular construction 27, for example a sewage pipe, comprises a supply chamber 3 for containing a hardenable plastic, a delivery head 2 comprising an outlet 5 for letting out the hardenable plastic from the delivery head 2, and a pump 11 for transporting the hardenable plastic from the supply chamber 3 to the outlet 5. During use, the outlet 5 is positioned at various angular positions with respect to a rotation axis 40, so that the entire circumference of the inner side of the wall 29 of the tubular construction 27 can be provided with the hardenable plastics coating. The supply chamber 3 comprises a flexible wall for optimal maneuverability of the device 1, whereby broad application of the device 1 is possible.

The invention claimed is:

1. A device for applying a coating of hardenable plastic to an inner side of a wall of a tubular construction, comprising:
    a supply chamber for containing a hardenable plastic,
    a delivery head comprising an outlet for letting out the hardenable plastic from the delivery head, and
    a pump for transporting the hardenable plastic from the supply chamber to the outlet,
    wherein the outlet is movable to various angular positions with respect to a rotation axis, for allowing the hardenable plastic to be let out of the delivery head at various angular positions with respect to the rotation axis,
    wherein at least an element of the delivery head comprising the outlet is connectable to a drive unit for making the outlet perform a rotation movement in a first direction and/or in a second direction about a centre axis of the delivery head, the second direction being opposite to the first direction, wherein the device further comprises a rotatably arranged elongated element which at least partially extends inside the supply chamber, and which is arranged to connect the drive unit to at least the element of the delivery head comprising the outlet, for rotating the element.

2. The device according to claim 1, wherein the elongated element extends through a member for closing an end of the supply chamber, and wherein a worm wheel part is arranged around a portion of the elongated element as present in the end closing member.

3. The device according to claim 1, wherein the elongated element comprises two non-aligned portions, wherein a longitudinal axis of only one portion coincides with the centre axis of the delivery head, and wherein the two non-aligned portions are flexibly connected to each other.

4. The device according to claim 1, wherein the elongated element comprises a first line, a second line and a spiral element.

5. The device according to claim 4, wherein the spiral element is housed outside the supply chamber in a third line.

6. The device according to claim 5, wherein the first, second and third line are surrounded by a fourth line to form a line assembly.

7. The device according to claim 1, wherein the supply chamber is at least partially integrated in the delivery head.

8. The device according to claim 1, comprising a camera which is arranged at a position for allowing the delivery head to be positioned at a starting position in the tubular construction.

9. The device according to claim 8, comprising a centring element for centring the delivery head in the tubular construction.

10. The device according to claim 9, wherein the camera is adapted to be positioned on the centring element.

11. The device according to claim 1, comprising a bearing which is positioned on a rotatable element inside the supply chamber, wherein the bearing is an open-type-bearing in which a chamber accommodating at least one ball of the bearing is at least partially open.

12. The device according to claim 1, wherein the supply chamber is connectable to a first and a second storage chamber for containing a first and a second component of the hardenable plastic, respectively, and wherein the pump is arranged to transport the first and the second component of the hardenable plastic from the first and the second storage chamber to the supply chamber via at least a first and a second line, respectively.

13. The device according to claim 12, further comprising a third storage chamber enclosing the first and the second storage chamber, wherein the third storage chamber is provided with a temperature controller and is adapted to contain a fluid which is intended to be in heat-exchanging contact with an outside of the first and the second storage chamber.

14. A method for applying a coating of hardenable plastic to an inner side of a wall of a tubular construction, the method comprising:
    providing the device according to claim 1,
    positioning a delivery head of the device at a starting position in the tubular construction via an opening providing access to the inner side of the wall of the tubular construction,
    operating a pump of the device for transporting the hardenable plastic from a supply chamber to an outlet of the delivery head,
    operating a drive unit of the device for making the outlet perform a rotation movement about a rotation axis at a predetermined rotation speed for applying the hardenable plastics coating to the inner side of the wall of the tubular construction at the site of the starting position,
    displacing the delivery head along a path extending between the starting position in the tubular construction and the opening providing access to the inner side of the wall of the tubular construction, for the application of the hardenable plastics coating to the inner side of the wall of the tubular construction,
    wherein a hardenable plastic comprising a first and a second component is used, the method additionally comprising:
    operating the pump of the device for transporting the first and the second component of the hardenable plastic from respectively a first and a second storage chamber to the supply chamber via respectively a first and a second line,
    mixing the first and the second component of the hardenable plastic, according to a predetermined mixing ratio, in the supply chamber, for obtaining a mixed hardenable plastic, and
    transporting the mixed hardenable plastic from the supply chamber to the outlet of the delivery head.

15. The method according to claim 14, further comprising:
    filling the first and the second storage chamber with respectively the first and the second component of the hardenable plastic, creating an underpressure in the first and the second storage chamber after filling thereof, in order to expel gas pockets which are formed during the filling of the first and the second storage chamber in respectively the first and the second component of the hardenable plastic, and creating and maintaining a predetermined pressure in respectively the first and the second storage chamber before respectively the first and the second component of the hardenable plastic is transported by the pump to the supply chamber.

16. The method according to claim 14, wherein the device comprises an elongated element which is connected to at least an element of the delivery head, and wherein the outlet of the delivery head is made to perform a rotation movement in a first direction and/or in a second direction about the centre axis of the delivery head, the second direction being opposite to the first direction.

17. The method according to claim 14, wherein the outlet of the delivery head is made to perform a rotation movement at a rotation speed which is controllable in a stepless manner.

18. The method according to claim 14, wherein the delivery head is positioned in a camera-controlled manner in the tubular construction.

19. The method according to claim 14, wherein the hardenable plastic, in the form of a first coating, is applied to the inner side of the wall of the tubular construction by displacement of the delivery head along a path extending between the starting position in the tubular construction and the opening providing access to the inner side of the wall of the tubular construction, wherein the outlet of the delivery head is made to perform a rotation movement in a first direction about the centre axis of the delivery head.

20. The method according to claim 19, further comprising application of a second coating of hardenable plastic by once again displacing the delivery head along the aforementioned path in the tubular construction, wherein the outlet of the delivery head is made to perform a rotation movement in a second direction about the centre axis of the delivery head, the second direction being opposite to the first direction.

21. The method according to claim 14, wherein the hardenable plastic comprises an epoxy resin comprising a first and a second component, and wherein the components are mixed in a mixing ratio within a range of 2:1-4:1.

22. A set of a device for applying a coating of hardenable plastic to an inner side of a wall of a tubular construction, or a sewage pipe, according to claim 1 and a device for cleaning the supply chamber and at least an element of the delivery head comprising the outlet of the delivery head of the coating applying device, wherein the cleaning device comprises means for supplying a cleaning fluid to the supply chamber and at least the element of the delivery head comprising the outlet of the delivery head of the coating applying device.

23. The set of a coating applying device and a cleaning device according to claim 22, wherein the means for supplying a cleaning fluid to the supply chamber and at least the element of the delivery head comprising the outlet of the delivery head of the coating applying device comprise two lines which are adapted to be connected to inlets of the supply chamber of the coating applying device for letting in components of the hardenable plastic to the supply chamber during operation of the coating applying device.

24. The set of a coating applying device and a cleaning device according to claim 22, wherein the cleaning device furthermore comprises driving means for making the supply chamber and at least the element of the delivery head comprising the outlet of the delivery head of the coating applying device perform a rotation movement during a cleaning action.

25. The set of a coating applying device and a cleaning device according to claim 24, wherein the driving means of the cleaning device comprise a combination of an electric motor and a rotation spring connected to an output shaft of the electric motor.

26. The device according to claim 1, wherein the supply chamber comprises a flexible wall.

* * * * *